Inventor:
FERDINAND LANGE-WIEHE

April 28, 1964   F. LANGE-WIEHE   3,130,891
FOLDING BOX
Filed March 20, 1961   6 Sheets-Sheet 2
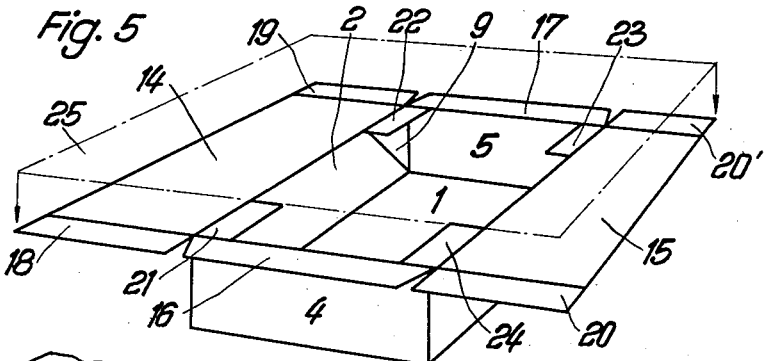
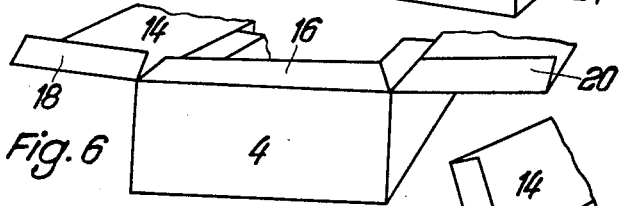
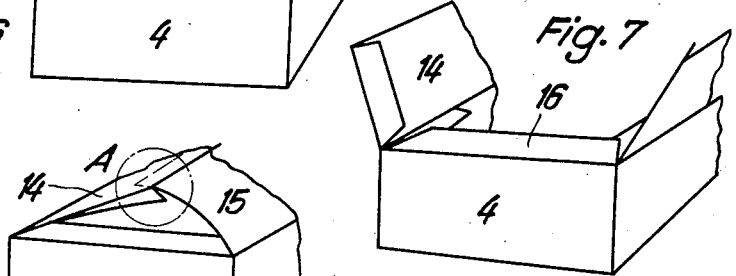
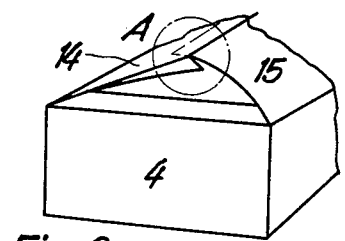
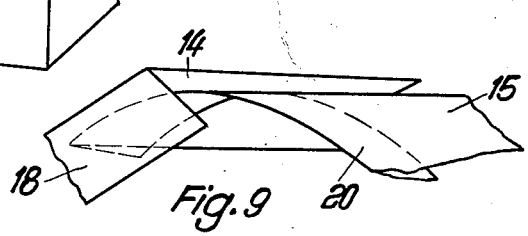
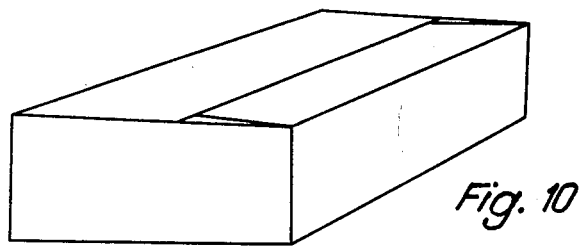
Inventor:
FERDINAND LANGE-WIEHE
BY Bierman & Bierman
ATTORNEYS April 28, 1964  F. LANGE-WIEHE  3,130,891
FOLDING BOX Filed March 20, 1961  6 Sheets-Sheet 3

Inventor:
FERDINAND LANGE-WIEHE
BY
Bierman + Bierman
ATTORNEYS

April 28, 1964   F. LANGE-WIEHE   3,130,891
FOLDING BOX

Filed March 20, 1961   6 Sheets-Sheet 4

Inventor:
FERDINAND LANGE-WIEHE
BY
Bierman + Bierman
ATTORNEYS

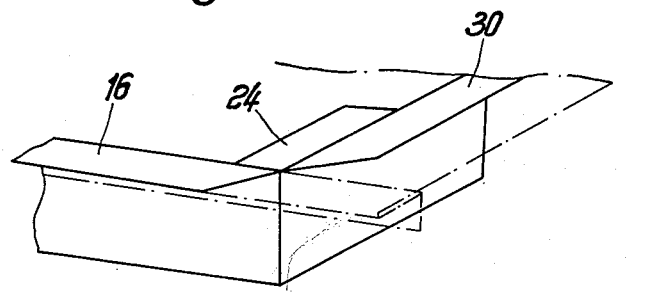
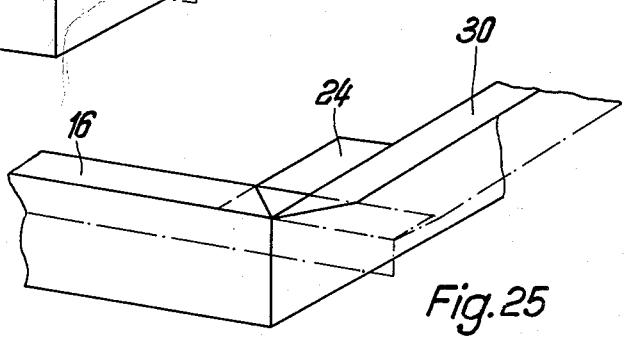
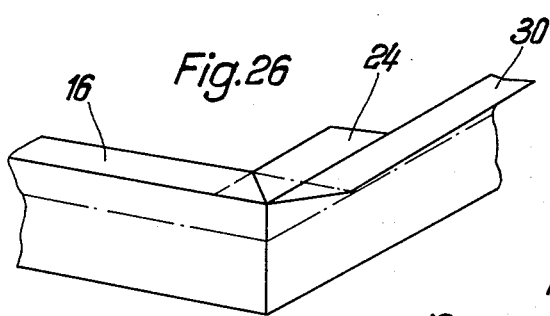
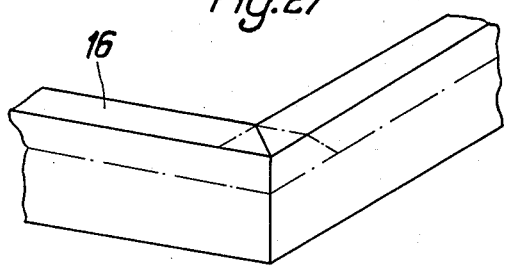

United States Patent Office 3,130,891
Patented Apr. 28, 1964

3,130,891
FOLDING BOX
Ferdinand Lange-Wiehe, Minden in Westphalia, Germany, assignor to Werner Bahlsen, Hannover, Niedersachsen, Germany
Filed Mar. 20, 1961, Ser. No. 96,875
3 Claims. (Cl. 229—16)

The present invention is directed to folding boxes usually made of cardboard, paper or the like, and more particularly to means for reinforcing the box against accidental damage.

It also includes a method of closing a folding box which is open on one side and which is formed between the side wall parts, a cover part in the form of a foil or the like being disposed and secured to side wall flaps which are bent out at right-angles, the flaps, the cover parts connected thereto and possibly other closure elements being folded onto the aperture.

In prior art boxes there was the difficulty that the foil may be incompletely welded to the parts of the blank along the box edges, with the resultant formation of grooves extending inwards into the box interior. In attempts to obviate these disadvantages the blank which is subsequently to form the box was not completely incised or punched out along the folding lines which subsequently form the box edge, so that the blank tore slightly and the fibrous edge thus formed cooperated with the thermoplastic substance of which the foil is made to give some guarantee of a tight closure. It has also been proposed to provide special sealing means at the points of weakness. However, when the method is carried into effect using machinery, these proposals do not completely obviate the formation of grooves or channels.

The present invention is intended and adapted to overcome the difficultities encountered in the prior art, it being among the objects of the invention to provide a closure and a method of making the same which results in a stronger box and which will withstand ordinary usage without damage.

According to the invention, before the cover part is fitted, flaps which are provided on a blank which will subsequently be formed into a box open on one side and which are disposed more particularly on the folded-in triangles are bent inwards at right-angles and connected to the cover part simultaneously with the other parts of the blank. The folded-in flaps form a support for the foil or the like which will subsequently be fitted, and so a fairly considerable force can be applied to the foil since there is a bearing support between the same and the box interior. The foil can therefore be pressed more strongly against the box edge and can therefore be better connected thereto or to the corresponding parts of the blank. Also, the presence of a large bearing surface for the foil near the box edge obviates the risk of subsequent tension likely to disengage the foil from the box edge at some subsequent time.

The parts of the blank can be connected to the cover part in any way although it is preferred to have the blank in a single piece.

According to a feature of the invention, to provide additional sealing-tightness along the box edges, the inwardly bent flaps are connected through the agency of folding triangles to one corner each of an outwardly bent flap. These folding triangles not only provide sealing-tightness but also strengthen the bearing surface for the cover part.

According to another feature of the invention, a foil serving as the cover part is bent around two opposite and outwardly folded flaps and is stuck by its edges to the corresponding side walls. The foil can then be folded around the other two outwardly folded flaps and also stuck to the box wall, so that very reliable sealing is provided along the box edges and, if required, all the outward edges of the blank can be covered by the foil.

More particularly, in the production of trays which are closed with a transparent foil, the box edge flaps which are not connected by means of folding triangles to the inwardly folded flaps are folded inwards before connection to the cover part, then connected thereto, whereafter the other flaps are folded onto the box aperture.

According to another feature of the invention, the two box edge flaps can take the form of cover flaps and are folded onto the box. Advantageously, according to the invention such cover flaps can comprise lateral strips which are also connected to the foil or the like and which are folded-in together with the other box edge flaps, and inserted into one another when the cover flaps are folded onto the box. A very readily closable cover can therefore be provided which protects the foil or the like forming the actual closure member from damage.

Various forms of the method according to the invention are illustrated by way of example in the accompanying drawings wherein:

FIGURES 2 to 10 show how the box produced by the first form of the method according to the invention is closed and folded;

FIGURES 16 to 27 show how the blank illustrated in FIGURE 15 is folded.

Figure 1:
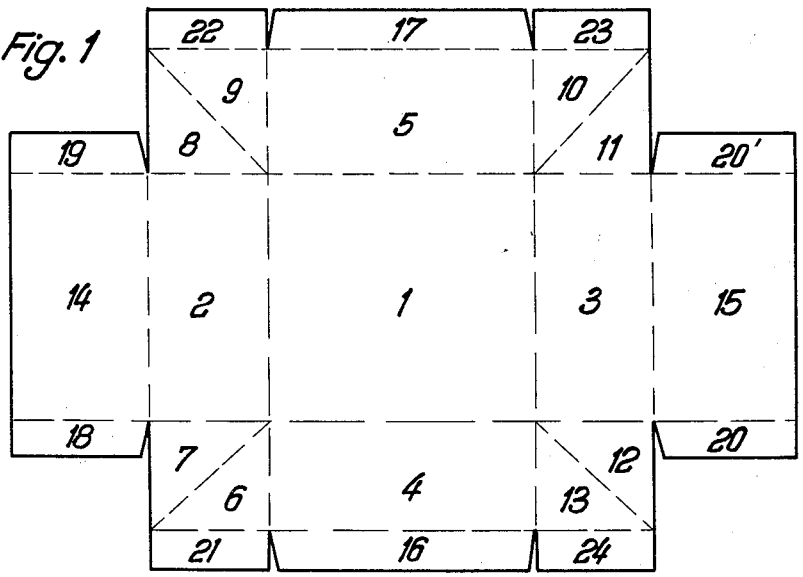
FIGURE 1 is a blank prepared for a first form of the method according to the invention.
Figures 3, 4:
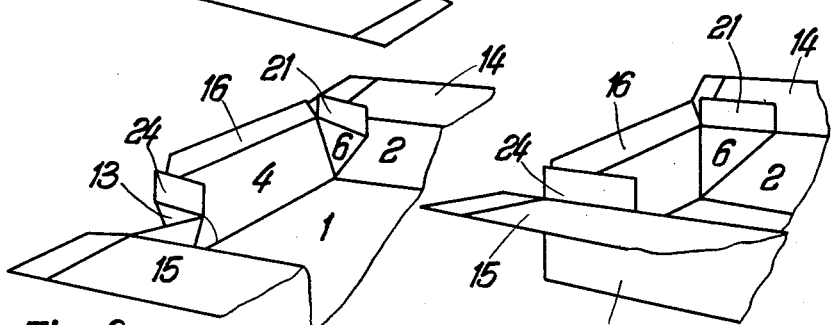

The blank shown in FIGURE 1 comprises a main surface 1 connected to side wall parts 2–5 which are interconnected through the agency of folding triangles 6–13. The parts 2–5 comprise projecting flaps 14–17 of which the flaps 14, 15 are cover flaps having lateral strips 18, 19 and 20 and 20′. The triangles 6, 9, 10, 13 have projecting strips 21–24. To fold in the bottom part of the box, the side wall parts 2–5 are erected by the triangles 6–13 being folded in, as can be seen in FIGURES 3 and 4.

Referring to FIGURE 5, the elements 14–20′ are all folded outwards, while projecting strips 21–24 are folded inwards. All such strips then lie in one plane, that is, in the plane in which the box will have to be closed. A cover part 25 which, in the present case, consists of a transparent foil, is then connected to the strips 14–20′. In places where the box is likely to be damaged, that is along the edges between the portions 2–5, the foil rests not only on the outwardly folded strips but also on the inwardly folded strips 21–24, a firm support surface thus being formed to which sufficient pressure can be applied to ensure welding along the edges.

After the foil has been fitted, the various strips and flaps 16–20′ are folded over as shown in FIGURE 6, whereafter the cover flaps 14, 15 are folded on to the aperture of the original box and inserted into one another at A (FIG. 8). This insertion has been made possible by previously folding in the strips 18, 19 and 20, 21, as can be seen in FIGURE 9. As can be seen in FIGURE 10, the closed box has a good appearance once it has been folded.

Figure 2:
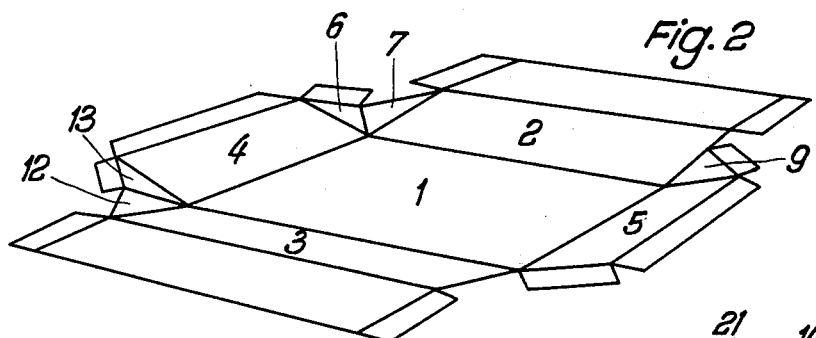
Figure 11:
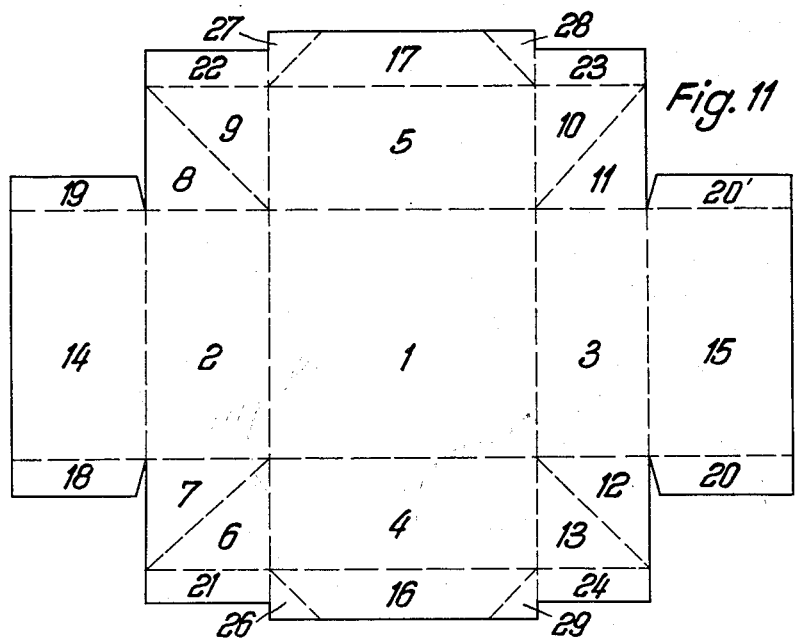
FIGURE 11 illustrates a second form of blank for the method according to the invention.
Figures 12, 13:
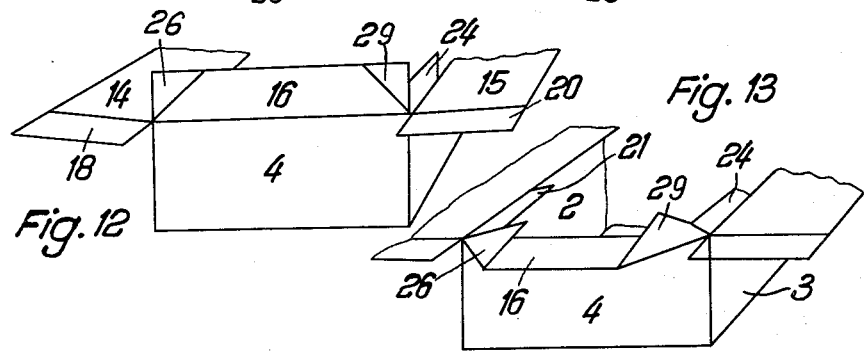
FIGURES 12 to 14 show how the blank shown in FIGURE 11 is folded.

The blank shown in FIGURE 11 is similar to the blank shown in FIGURE 1 except for the provision of small folding triangles, 26, 29 and 27, 28 between the flaps 16, 17 and the adjacent strips 21, 24 and 22, 23 which are to be folded inwards; the last-mentioned strips are therefore each connected to two strips which are to be folded outwards. Folding-in is performed as shown in FIGURES 2 to 4. When, starting from the position illustrated in FIGURE 12, the flaps 16, 17 are to be folded outwards and the strips 21–24 are to be folded inwards, the triangles 26–29 are folded simultaneously and form a seal along the box edges, as can be seen in FIGURE 13.

Figure 14:
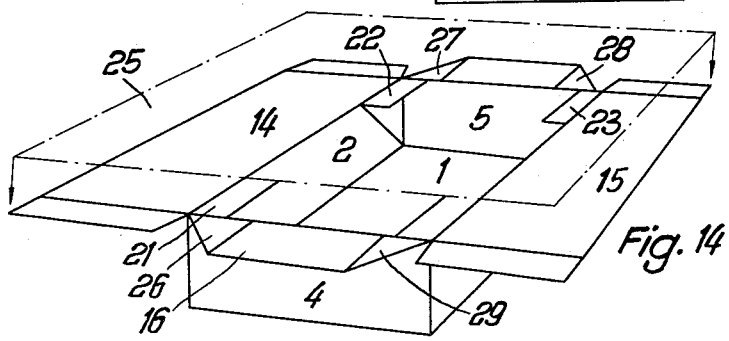

As can be seen in FIGURE 14, the box can be closed by means of a foil 25 similarly to what is shown in FIGURE 5, except that in the case of FIGURE 14 the foil is also connected to the folding triangles 26–29. Further folding-in can proceed as shown in FIGURES 6 to 10.

Figure 15:
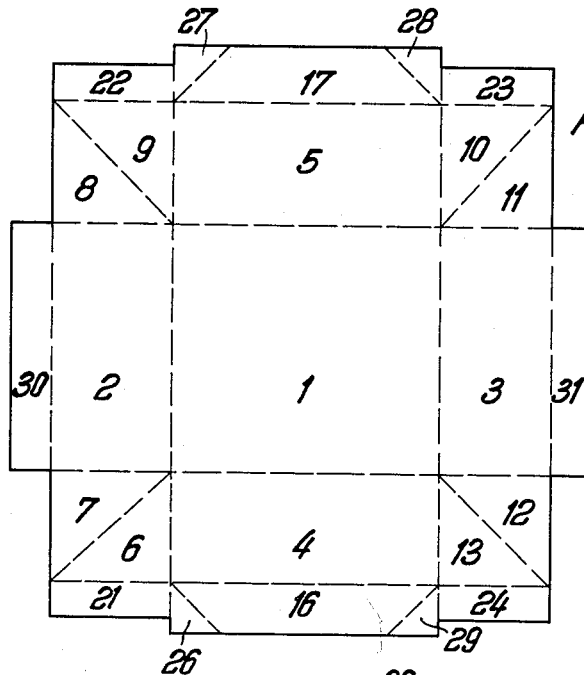
FIGURE 15 illustrates a blank prepared for a third form of the method according to the invention.
Figure 16:
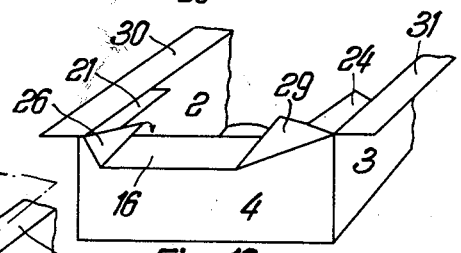
Figure 17:
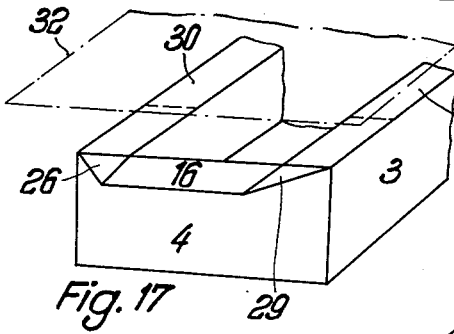
Figure 18:
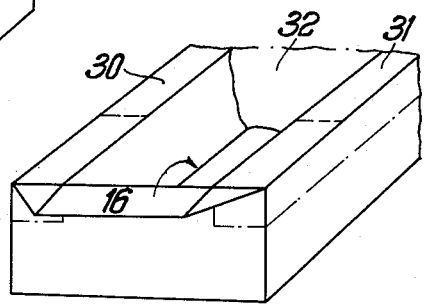
Figure 19:
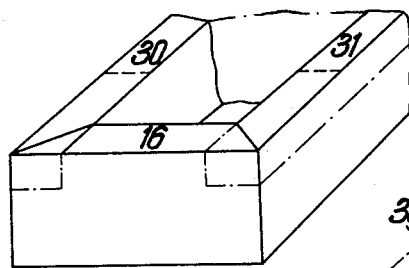
Figure 20:
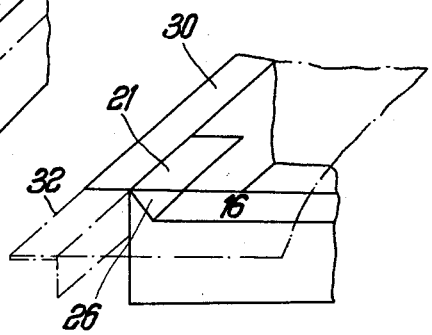

Referring to the blank shown in FIGURE 15, the only difference from the embodiments hereinbefore described concerns the cover flaps, since simple strip-like or narrow flaps 30, 31 are used in the blank shown in FIGURE 15. For the rest, such blank corresponds to the blank shown in FIGURE 11. The blank shown in FIGURE 15 is initially folded in the manner hereinbefore described. After the box underpart has been folded in, flaps 16, 17 are folded outwards and strips 21–24 are folded inwards, whereafter, and as hereinbefore described, the foil can be placed on such strips or flaps and the outwardly folded strip-like flaps 30, 31 can be fitted. Alternatively, and as shown in FIGURES 16 and 17, the flaps 30, 31 can first be folded inwards, whereafter the foil can be fitted. On the side receiving the flaps 30, 31 the foil 32 illustrated is a little wider than the box aperture; on the other side the foil 32 is terminated by flaps 16, 17. After connection to flaps 16, 17 and 30, 31 and to the folding triangles 26–29 the projecting part of the foil is connected to the side walls 2, 3 and so folded around the strips 16, 17 as to be stuck by its corners to the side wall parts 4, 5, whereafter the strips 16, 17 are folded on to the box aperture. Such a box, if closed, for instance, with a transparent foil, has a decorative strip running around its edge as can be seen in FIGURE 19.

Figure 21:
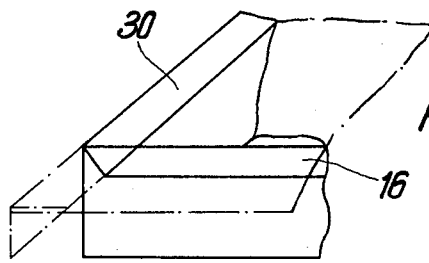
Figure 22:
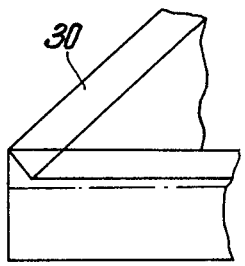
Figure 23:
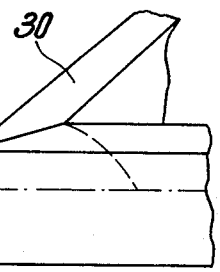

If required, the foil can be placed on flaps 30, 31 after the same have first been folded outwards and stuck thereto and, of course, to the similarly outwardly folded flaps 16, 17. The foil, if large enough, can first be folded outwards around the flaps 30, 31, returned therebelow, and stuck to the side walls 2, 3. After the flaps 30, 31 have been folded onto the box aperture, the foil can be folded around flaps 16, 17 in the same way and stuck, together with the folded-in parts produced, to the box wall 4, 5, as can be seen in FIGURES 21 to 23.

If the corners of the flaps 30, 31 are cut off, the foil can first be folded around the flaps 16, 17 and, after the same have been folded around, the foil can be folded around flaps 30, 31 and secured by its edges to the side walls 2, 3 as shown in FIGURES 24 to 27. The boxes thus produced are of similar appearance to the box shown in FIGURE 19 except that in the case of the box shown in FIGURES 24 to 27, the foil, in addition to covering the box edge parts likely to be damaged, also covers all the edges of the blank and thus provides sealing tightness.

As cover parts in the method according to the invention there can, of course, be used not only thin foils but, and more particularly in association with the method shown in FIGURES 1 to 14, any materials having the required properties of sealing tightness, for example lined paper, aluminium foils or the like.

What is claimed is:

1. A folding box made of a single blank, the latter comprising a central bottom portion of substantially rectangular form, substantially rectangular sides extending from the edges of said bottom, a pair of inwardly folding triangles between each of the adjacent sides, said bottom, sides and triangles forming a box open at the top, substantially rectangular cover flaps extending from two opposite sides of said blank, side flaps extending from the other two opposite sides, projecting strips extending from the triangles adjacent to said two opposite sides, the length of said projecting strips being equal to the length of said side flaps, said projecting strips being bent inwardly to form flat areas in the upper corners of said box, whereby a foil can be sealed onto said projecting strips, lateral strips extending from the ends of said cover flaps, said cover and side flaps and said lateral strips facing outwardly from said box, a cover part secured to said flaps and strips, said lateral strips and side flaps being folded inwardly upon their respective cover flaps and sides, said cover flaps being infolded.

2. A folding box according to claim 1 characterized in that one of said cover flaps is folded into the space between the other cover flap and its infolded lateral strips.

3. A folding box according to claim 1 characterized in that triangles are provided in the edges of said side flaps adjacent to said projecting strips.

References Cited in the file of this patent

UNITED STATES PATENTS

| | | |
|---|---|---|
| 1,279,589 | Robson | Sept. 24, 1918 |
| 1,845,456 | Wagner | Feb. 16, 1932 |
| 2,226,089 | Anthoney et al. | Dec. 24, 1940 |
| 2,660,362 | Schilling | Nov. 24, 1953 |
| 2,713,452 | Williamson | July 19, 1955 |
| 2,886,231 | Petersen | May 12, 1959 |
| 2,912,153 | Lange | Nov. 10, 1959 |
| 2,923,211 | Schwebs | Feb. 2, 1960 |
| 2,932,439 | Sparling | Apr. 12, 1960 |
| 2,942,769 | Kuchenbecker | June 28, 1960 |
| 3,078,027 | Keith | Feb. 19, 1963 |